E. T. MIDDLEMISS.
METHOD OF AND MEANS FOR TREATING FINELY CRUSHED ORES AND OTHER MATERIALS.
APPLICATION FILED MAY 20, 1920.
1,370,898.
Patented Mar. 8, 1921.
7 SHEETS—SHEET 1.
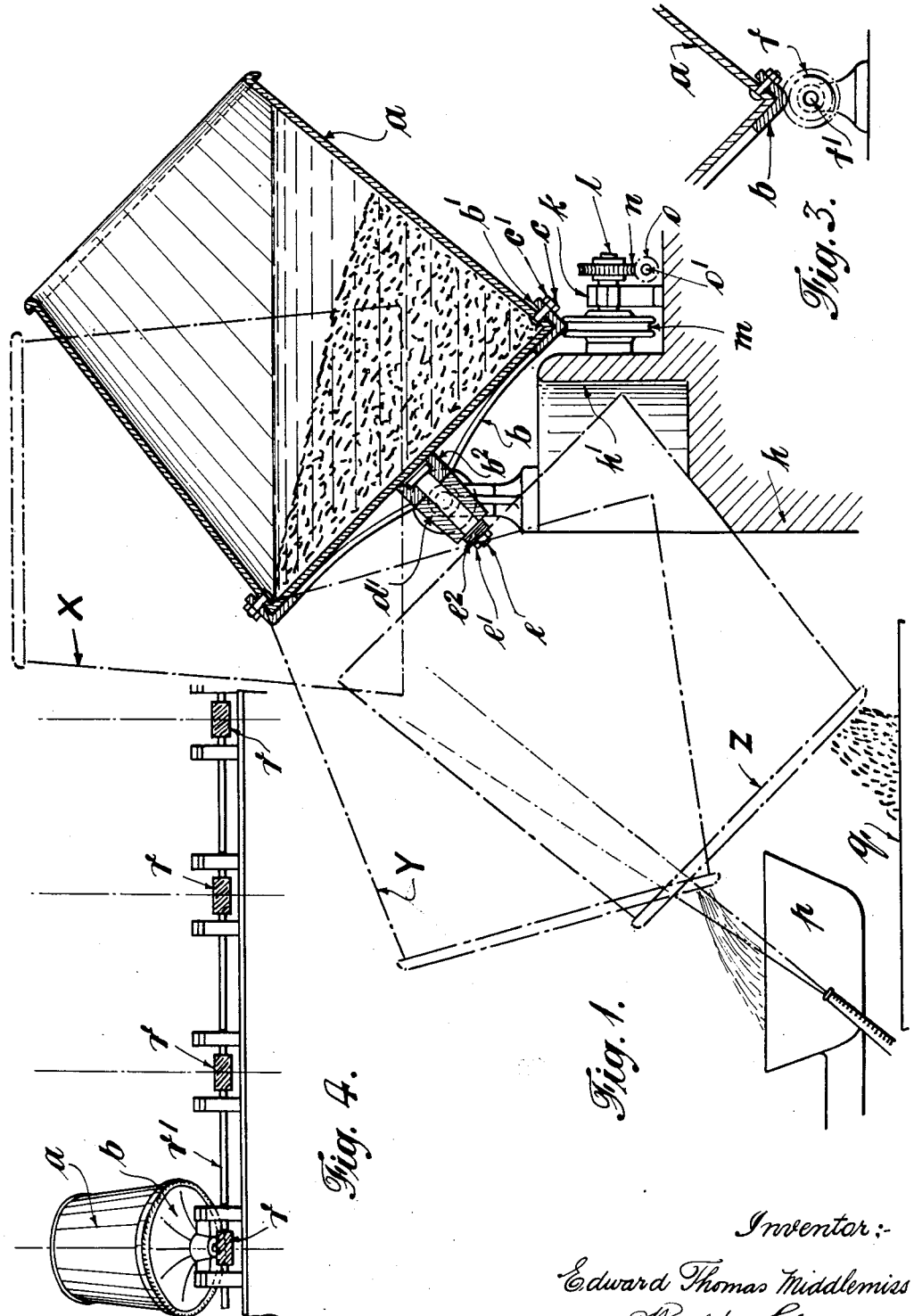
Inventor:-
Edward Thomas Middlemiss
By his Attorney:- Walter Gunn

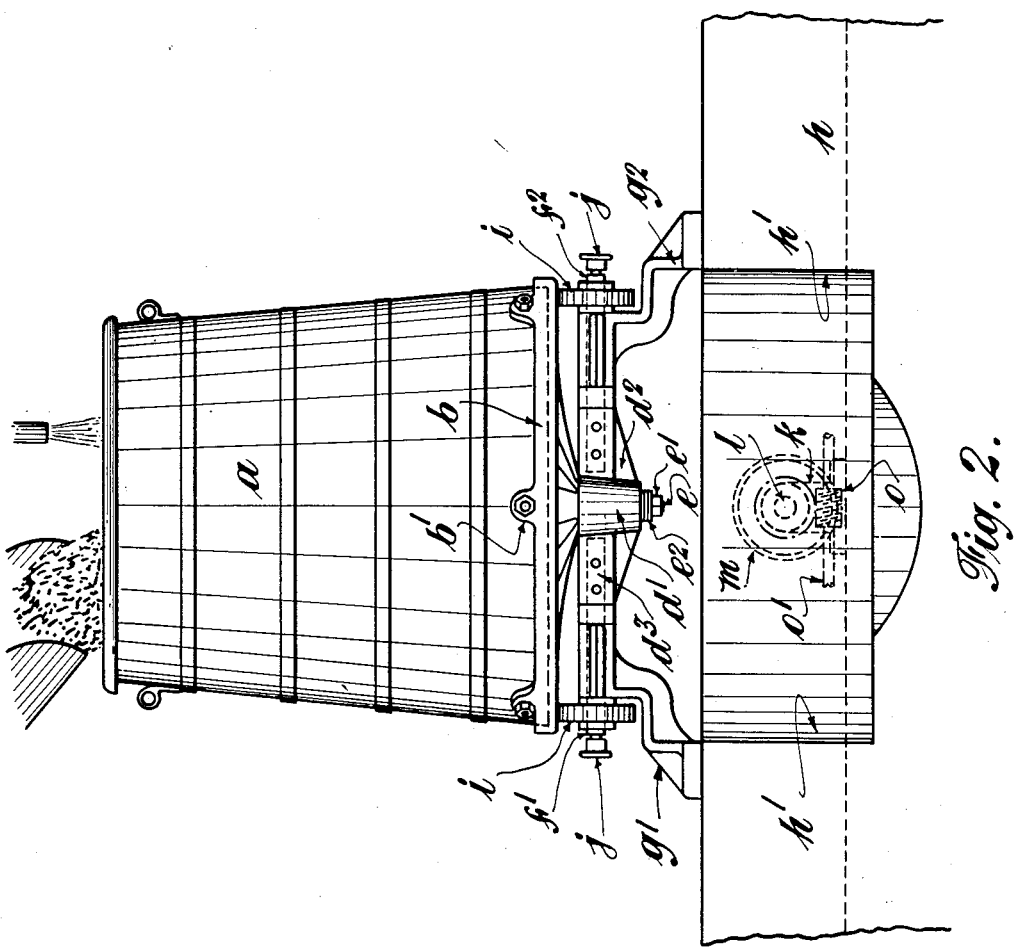

E. T. MIDDLEMISS.
METHOD OF AND MEANS FOR TREATING FINELY CRUSHED ORES AND OTHER MATERIALS.
APPLICATION FILED MAY 20, 1920.

1,370,898.

Patented Mar. 8, 1921.
7 SHEETS—SHEET 3.

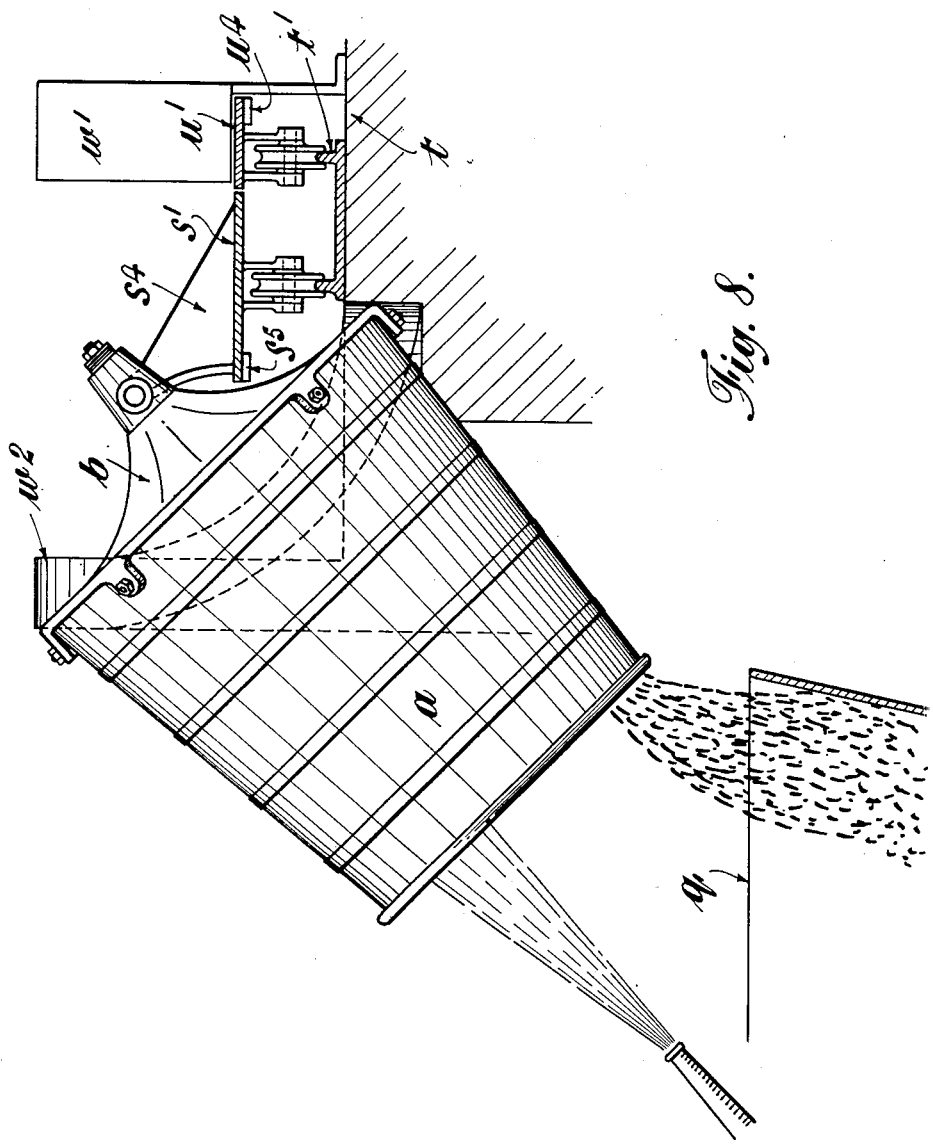

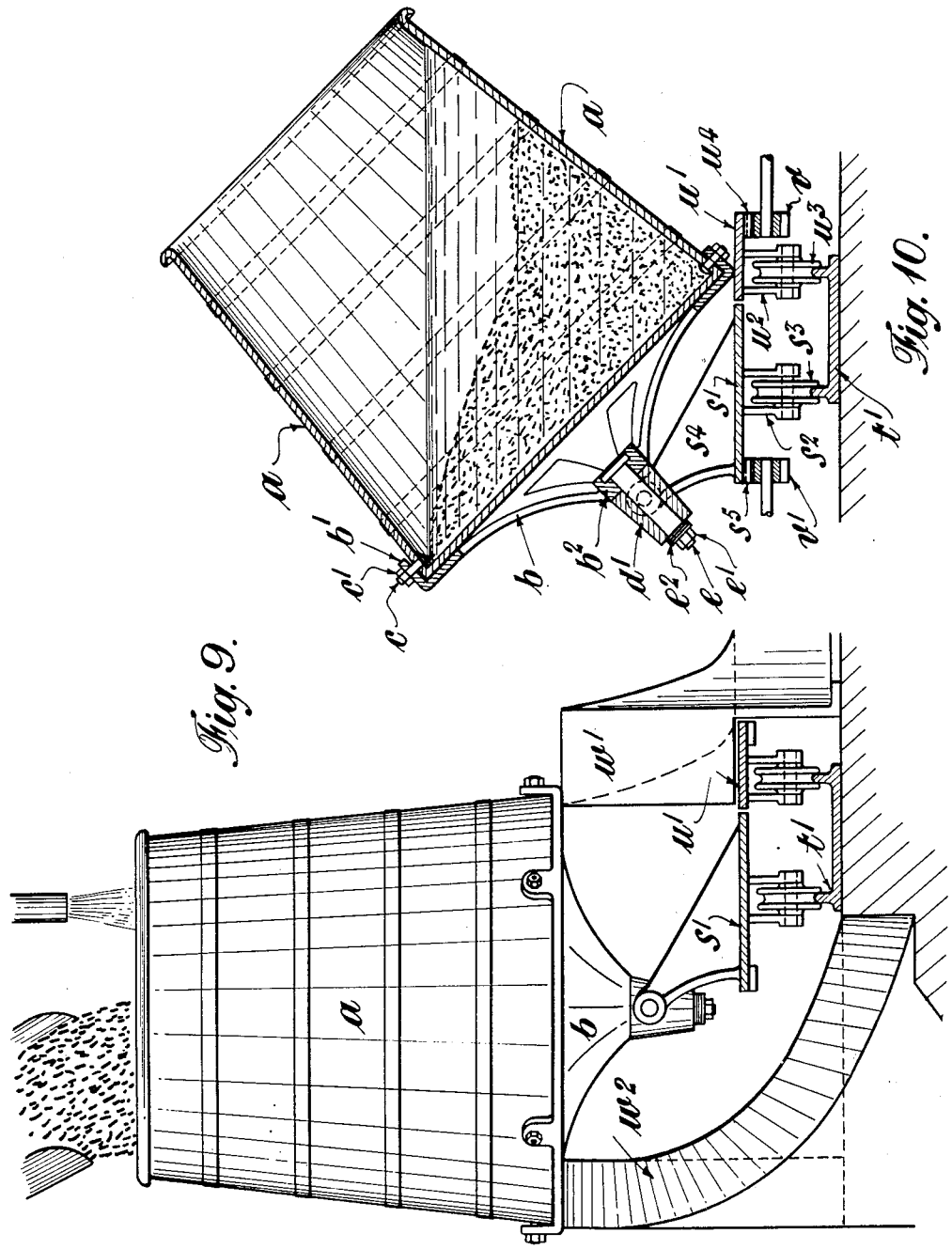

E. T. MIDDLEMISS.
METHOD OF AND MEANS FOR TREATING FINELY CRUSHED ORES AND OTHER MATERIALS.
APPLICATION FILED MAY 20, 1920.

1,370,898.  Patented Mar. 8, 1921.
7 SHEETS—SHEET 7.

Inventor:-
Edward Thomas Middlemiss
By his Attorney:- Walter Gunn

UNITED STATES PATENT OFFICE.

EDWARD THOMAS MIDDLEMISS, OF MANCHESTER, ENGLAND.

METHOD OF AND MEANS FOR TREATING FINELY-CRUSHED ORES AND OTHER MATERIALS.

1,370,898.     Specification of Letters Patent.      Patented Mar. 8, 1921.

Application filed May 20, 1920. Serial No. 382,936.

*To all whom it may concern:*

Be it known that I, EDWARD THOMAS MIDDLEMISS, a subject of the King of Great Britain and Ireland, and resident of Manchester, England, have invented a certain new and useful Improved Method of and Means for Treating Finely-Crushed Ores and other Materials, of which the following is a specification.

This invention refers to the treatment of finely crushed materials with a liquid or liquids and relates in particular to the leaching of ores, or the separation of metals therefrom, by the acid or wet process. In order effectually and economically to separate metals from their ores by the acid or wet process it is desirable that the ores be crushed to a fine state of division so that the reagent may reach all particles of the ore, the finer the division the better. Stationary vessels fitted with agitators movable to and fro for keeping the material constantly in a loose state are usually employed, but such apparatus does not lend itself to the successful treatment of ores in a finely crushed state, for the reason that the ores, the impurities therein and the leaching liquor make a thick mud-like body which on being stirred does not allow of the rapid action of the liquor on the metals.

This invention has for its object an improved method of and apparatus for treating finely crushed materials, and in particular finely crushed ores, with a liquor or reagent whereby the materials and impurities while being operated upon are not unduly disturbed, and whereby the liquor or reagent is practically quiescent, only so much movement being given to the finely crushed material as will suffice to expose the particles successively to the reagent.

According to the invention, the ore or other material to be treated after being finely crushed, is placed in a vessel arranged at an angle to the vertical together with the liquor or other reagent to be used, the quantity of crushed material being such as not to exceed a level corresponding to the highest part of the bottom of the vessel, and the quantity of liquor being such as to completely submerge the ore. The vessel is rotated by suitable driving gear, whereupon portions of the finely crushed material are carried up until they exceed the angle of repose when they commence by gravity to roll down over the face of the other portions of the material, this operation being continuous and every portion of the crushed material, in turn, rolling down the face of the other portions. That is to say, starting with the bulk of the material lying inert against the bottom and lower side of the vessel, the rotation of the vessel tends to carry the material bodily around with it, but with the material loose and free to alter its position, those portions cease to be carried around by the vessel which exceed the angle of repose and fall, or roll, by gravity down the face of those portions of the material lying beneath, and which have not yet exceeded the angle of repose but which in turn, do exceed such angle, and also roll down the material beneath, and so on continuously. In addition to rolling down upon the face of the lower mass of crushed material the particles also have a movement in a spiral path. With all the particles of material thus caused to successively and repeatedly roll down upon each other, and in directions and for distances varying with their position relatively to the center or sides of the vessel, they are thereby effectively exposed to the action of the liquor or other reagent.

The speed of the vessel is slow so as not to unduly agitate the material and any impurities that may be present and so also as to keep the liquor or reagent practically quiescent in which condition it is best adapted for attacking the material.

The improved apparatus may be used singly or in series and in the latter case the vessels will be arranged either in a row, or in a circle with driving mechanism common to all and with facilities for emptying each vessel, while the others are in operation. In such case also means may be provided for automatically emptying the vessels one by one.

The invention further consists in the constructional forms of the apparatus as hereinafter described and illustrated upon the accompanying drawings wherein:

Figure 1 is a side sectional elevation of the improved apparatus adapted to be used singly.

Fig. 2 is a front elevation of the same apparatus.

Fig. 3 is a sectional elevation showing an alternative method of imparting rotary movement to the vessel shown in Fig. 1.

Fig. 4 is a rear elevation of the same apparatus and of the driving gear when adapted for use as a series in a row.

Fig. 8 is a like view on line 8—8.

Fig. 9 is a like view on line 9—9.

Fig. 10 is a like view on line 10—10 but showing the vessel in section.

Fig. 11 is a front view of the cams shown in Fig. 5, while

Fig. 12 is a side elevation of a detail part hereinafter referred to.

Figure 5:
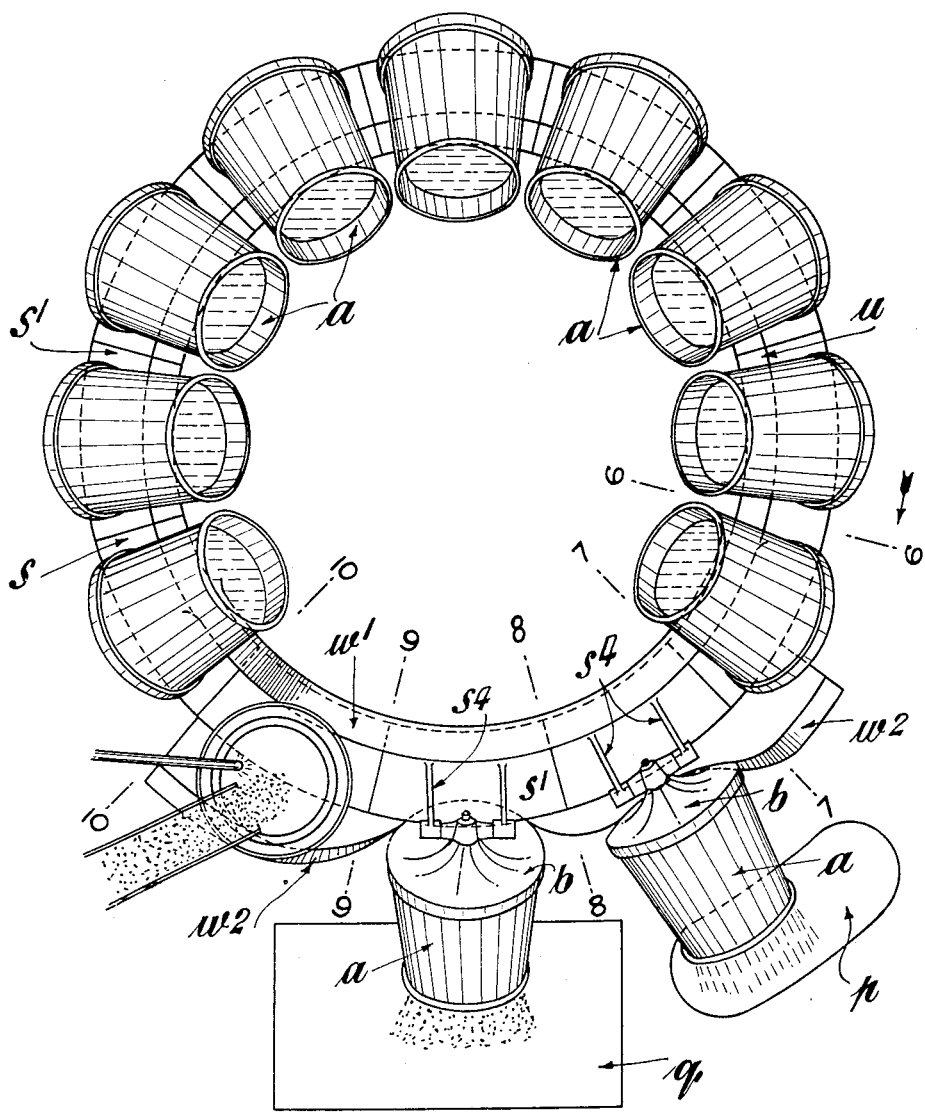
Fig. 5 is a plan view of the apparatus when used in series in a circle and adapted for automatic emptying.
Figure 6:
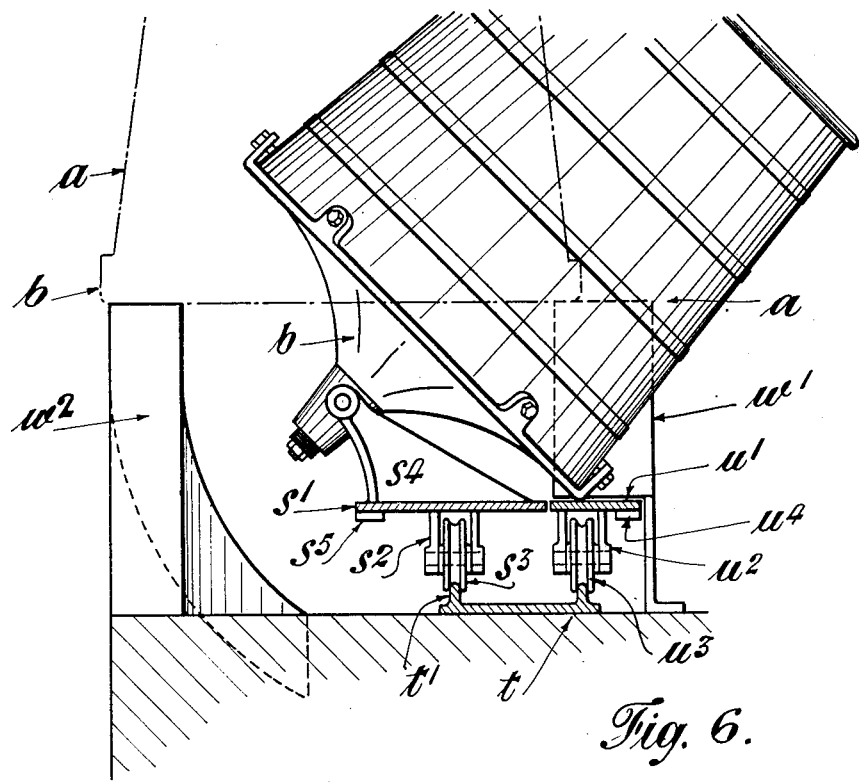
Fig. 6 is a transverse sectional elevation, to an enlarged scale, on line 6—6 of Fig. 5 looking in the direction of the arrow.
Figure 7:
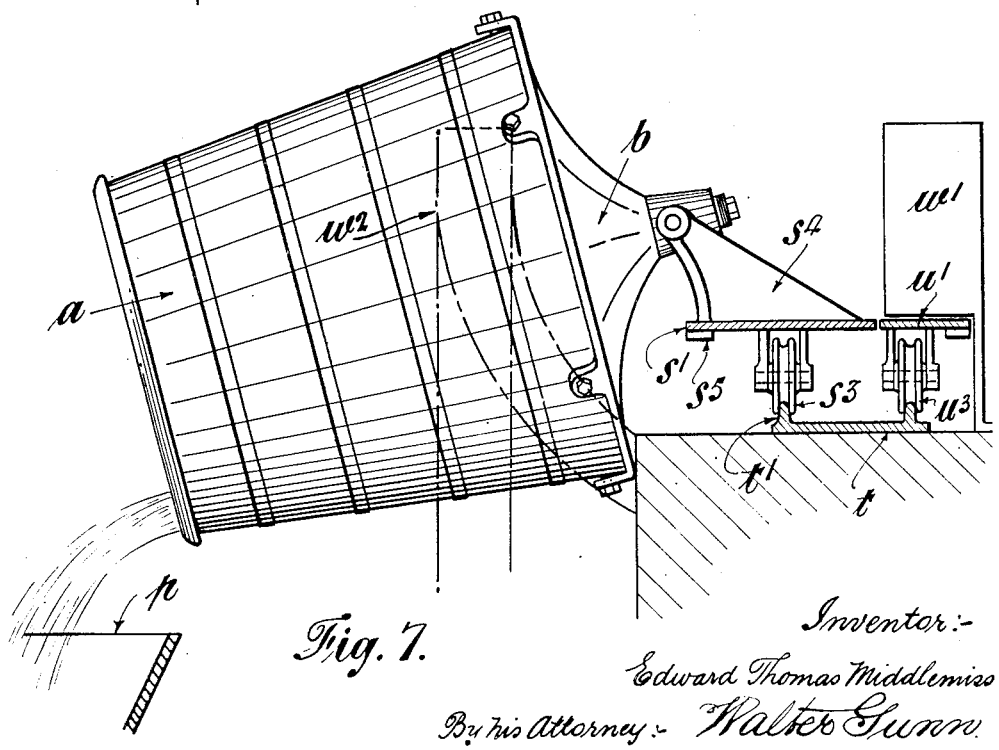
Fig. 7 is a like view on line 7—7.
Figure 11:
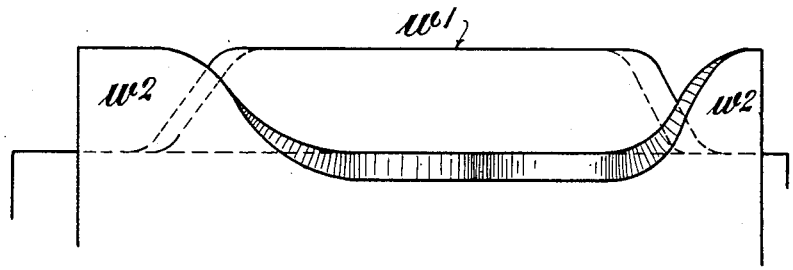
Figure 11A:
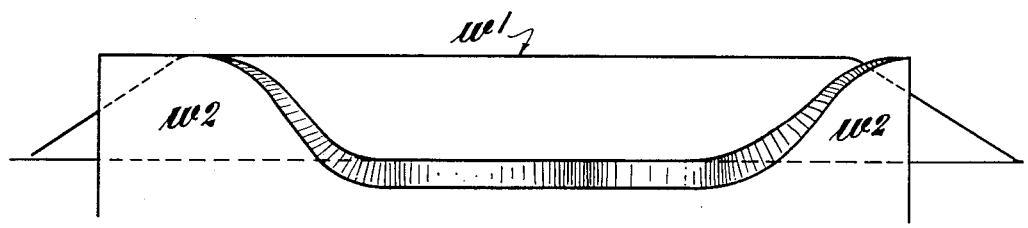
Fig. 11a is a front view of the cams as they would appear if straightened.

Referring to Figs. 1, 2 and 3 which illustrate the single vessel type of apparatus $a$ is the vessel preferably made of wood and preferably somewhat of the shape of a truncated cone, with the smaller end open. $b$ is a spider or frame on which the vessel is secured by bolts $c$ and nuts $c'$ the bolts passing through the sides of the vessel and lugs $b'$ on the top face of the spider. Through a hollow boss $b^2$ formed centrally of the spider and through a further hollow boss $d'$ of a bracket-like member $d^2$ passes a stud $e$ the head of which lies in a recess of the boss $b^2$ while its other end is reduced in diameter and screw-threaded to receive a nut $e'$, between which, and the face of the boss, is interposed a spring washer $e^2$, said stud, nut and washer serving to hold the spider $b$ securely to the boss $d'$ while allowing the spider and vessel to rotate around the stud. Extending from diametrically opposite sides of the boss $d'$ are tubular bosses $d^3$, $d^3$ and secured into each boss is a short length of shaft $f'$, $f^2$. Each of said shafts $f'$, $f^2$ is journaled in brackets $g'$, $g^2$ mounted on opposite sides of a gap $h'$ in the platform $h$ on which the apparatus is mounted. Adjacent to their free ends each shaft is fitted with a roller $i$ rotatably mounted on the shaft and contacting with the underside of the spider so as to take some of the weight of the vessel especially when vertical, and help in holding the vessel concentric to the stud $e$. For the purposes of lubrication each shaft $f'$, $f^2$ is drilled down its center and laterally and is fitted with a lubricator $j$ preferably of the Stauffer type.

Also mounted upon the platform $h$ but in a position to the rear of and below the said brackets $g'$, $g^2$ is a further bracket or pedestal $k$ and journaled in said bracket and in a bearing on the platform is a short shaft $l$. Mounted upon and keyed to the shaft $l$ is a grooved roller $m$ upon which the rim of the spider aforesaid is adapted to bear. Also keyed upon the shaft $l$ is a worm wheel $n$ and meshing with such worm wheel is a worm $o$ mounted upon a shaft $o'$ which receives continuous rotary motion from any convenient source of power.

The method of operation is as follows: The vessel $a$ is first raised from its angular position to a vertical position by means of slings engaging lugs $a^3$ and charged with a supply of finely crushed material and also with a supply of acid or other liquor for treating same, see chain lines marked $x$ in Fig. 1, and see also Fig. 2. The vessel is then lowered to the angular position shown in full lines in Fig. 1, i. e., until the rim of the spider meets with and rests upon the grooved pully $m$, the angle of the vessel being preferably about 45°. The rotation of the pulley $m$ through the medium of the worm and worm wheel imparts a slow rotary movement to the vessel $a$ and thereby causes the particles of crushed material in the vessel to roll over each other and thus become successively exposed to the action of the liquor as before described.

When the material has received sufficient treatment the vessel is again raised to the vertical and then lowered in the opposite direction until it assumes the angular position shown by chain lines marked $y$ in Fig. 1 when the liquor is discharged from the vessel $a$ into a trough or conduit $p$.

The lowering of the vessel is continued until it reaches the position shown by broken lines marked $z$ in Fig. 1 when the tailings or semi-solid material is washed out by means of a jet of water into a receptacle $q$. The vessel is then restored to the vertical position and charged with a fresh supply of crushed material and liquor after which it is again lowered on to the pulley $m$ and the leaching or like operation effected.

In place of using the grooved pulley $m$ to impart rotary motion to the vessel $a$, the rim of the spider $b$ may be formed with teeth adapted to engage with a worm $r$ on a shaft $r'$ see Fig. 3, and thus be positively driven.

In place of a single vessel there may be a number of vessels arranged in a row, see Fig. 4, there being one driving shaft $r'$ common to all the worms, and the vessels being adapted for independent handling for filling and emptying.

Instead of the vessels being arranged in a row they may be arranged in a circle and instead of being raised and lowered by manually controlled sling mechanism, they may be raised and lowered automatically. Fig. 5 is a plan of one arrangement.

In this example a series of vessels $a$, say twelve, are circumferentially arranged around a circular platform $s$ built up of segmental plates $s'$ secured together at their abutting edges and having on the under-side one or more pairs of depending bearing brackets $s^2$ in which are journaled grooved wheels $s^3$ adapted to run on a rail $t'$ laid upon the foundation $t$. The spider $b$ for supporting each vessel $a$ is carried in brackets $s^4$ on the upper face of each plate $s'$.

Figure 12:
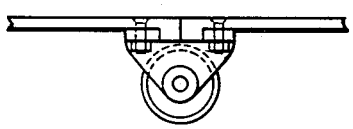

Concentrically arranged within the said circular platform is a further platform $u$ the upper surface of which is preferably level with the surface of the platform $s$ and said further platform $u$ is formed similarly to the platform $s$ of segmental plates $u'$ with depending bearing brackets $u^2$ in which are journaled grooved wheels $u^3$ adapted to run upon the rail $t'$. The abutting edges of the plates of each platform may be formed as shown in Fig. 12 and held together by a single bracket bolted to each plate and carrying a grooved wheel $s^3$ or $u^3$ respectively. The normal working position of each vessel $a$ is inclined inward toward a perpendicular line passing through the center of the platform with the rim of the spider $b$ resting upon the inner circular platform $u$. On the under-face of the platform $u$ is an annulus of gear teeth $u^4$ and meshing with such teeth is a worm or gear wheel $v$ driven from any suitable source of power. Upon the under-face of the platform $s$ is an annulus of gear teeth $s^5$ and meshing with such teeth is a worm or gear wheel $v'$. The platform $u$ is continuously driven, preferably at a slow rate of speed, and imparts a rotary motion to the vessels $a$, while the platform $s$ may be either intermittently or continuously driven, also at a slow rate of speed, to travel each vessel around the battery. Upon reaching a predetermined point in the battery each vessel may be lifted, after the movement of the outer platform is stopped, and be emptied and refilled in a similar manner to that described for the single vessel type of machine, but preferably the series of operations will be automatically effected in the following manner and as clearly illustrated in Figs. 6, 7, 8, 9 and 10.

A series of cam surfaces $w'$, and $w^2$ are built up in any convenient manner one $w'$ inside and the other $w^2$ outside the circular platforms. On a vessel $a$ reaching the cam surfaces it is automatically raised to the vertical position see broken lines in Fig. 6, and then tilted in the opposite direction to the position shown in Fig. 7 when the liquor is discharged, and then to the position shown in Fig. 8, when the tailings or semi-solid matter is washed out by means of a jet. The vessel is next raised to a vertical position, as shown in Fig. 9, when it receives a fresh charge of crushed material and liquor and finally is lowered on to the inner platform $u$, see Fig. 10. As shown in Fig. 5 the arrangement is such that as one vessel is discharging its liquid contents, another is discharging its semi-solid contents, while a further vessel is receiving a fresh charge, the remainder of the vessels being rotated by the inner platform and the material in each being treated in the manner before described. With a battery of vessels constructed, arranged and operating as described a large amount of material may receive the maximum of treatment with a minimum of labor in a minimum of time.

In all cases the quantity of crushed material placed in a vessel will preferably not exceed the level of the highest part of the bottom end of the vessel, and the liquor will in all cases exceed such level, the object being to cause every particle of material to become exposed to the action of the liquor as the vessel rotates.

Although described and intended chiefly for use in the leaching of ores, it will be understood that the invention may be used in the treatment of any other finely crushed materials with liquor, especially where a chemical reaction is required. In such connection the vessel may be closed at its narrower end.

What I claim is:—

1. The method of treating finely crushed materials with a liquor consisting in placing the crushed material in a cylindrical vessel arranged at an angle of about 45°, the crushed material not exceeding the level of the highest part of the bottom of the vessel, filling the vessel with the liquor to a level sufficient to completely submerge the material and slowly rotating the vessel whereby the crushed material is bodily rotated and each particle on exceeding the angle of repose is caused by gravity to roll down over the other particles in a slightly spiral path, while exposed to the action of the liquor which is more or less quiescent, substantially as herein set forth.

2. The method of separating metals from their ores by the wet process, consisting in placing the ores, previously reduced to a fine state of division, in an open cylindrical vessel arranged at an angle of about 45°, the crushed ore not exceeding the level of the highest part of the bottom of the vessel, filling the vessel with liquor to a level sufficient to submerge the ore and slowly rotating the vessel whereby the crushed ore is bodily rotated and at the same time each particle on exceeding the angle of repose is caused successively to roll down by gravity over the other particles in slightly spiral paths while exposed to the action of the liquor, substantially as herein set forth.

3. Apparatus for treating finely crushed materials with a liquor consisting of an open vessel arranged at an angle to the vertical, means for rotatably supporting said vessel about its longitudinal axis, further means for axially supporting said vessel about a horizontal axis, and means for supporting the vessel in its angular position and slowly rotating the same, substantially as herein set forth.

4. Apparatus for treating finely crushed materials with a liquor consisting of a series of open vessels arranged in a row and each vessel arranged at an angle to the vertical, means for rotatably supporting said vessel about its longitudinal axis, further means for axially supporting said vessel about a horizontal shaft, and means for supporting the vessels in their angular position and slowly rotating the series, substantially as herein set forth.

5. Apparatus for treating finely crushed materials with a liquor consisting of a series of open vessels arranged in a circle and each vessel arranged at an angle to the vertical, means for rotatably supporting each vessel about its longitudinal axis, further means for axially supporting each vessel about a horizontal shaft, and means for supporting the vessels and slowly rotating the series substantially as herein set forth.

6. Apparatus for treating finely crushed materials with a liquor consisting of a series of open vessels arranged in a circle and each vessel arranged at an angle to the vertical, means for rotatably supporting each vessel about its longitudinal axis, further means for axially supporting each vessel about a horizontal shaft, means for supporting the vessels by their lower edges and rotating the vessels, and further means for supporting the said horizontal shafts and bodily traveling them around the circle, substantially as herein set forth.

7. Apparatus for treating finely crushed materials with a liquor consisting of a series of open vessels arranged in a circle and each vessel arranged at an angle to the vertical, means for rotatably supporting each vessel about its longitudinal axis, further means for axially supporting each vessel about a horizontal shaft, means for supporting the vessels by their lower edges and rotating the vessels, further means for supporting the said horizontal shafts and bodily traveling them around the circle and an arrangement of fixed cams whereby the vessels as they are traveled around the circle are automatically raised from their normal angular position to the vertical, then lowered in the reverse direction for emptying, then automatically returned to the vertical for charging and finally lowered to their normal angular position, substantially as herein set forth.

In witness whereof I have hereunto set my hand.

EDWARD THOMAS MIDDLEMISS.